April 8, 1930. A. E. WOLFF 1,753,229
FLUSH VALVE
Filed Sept. 27, 1927
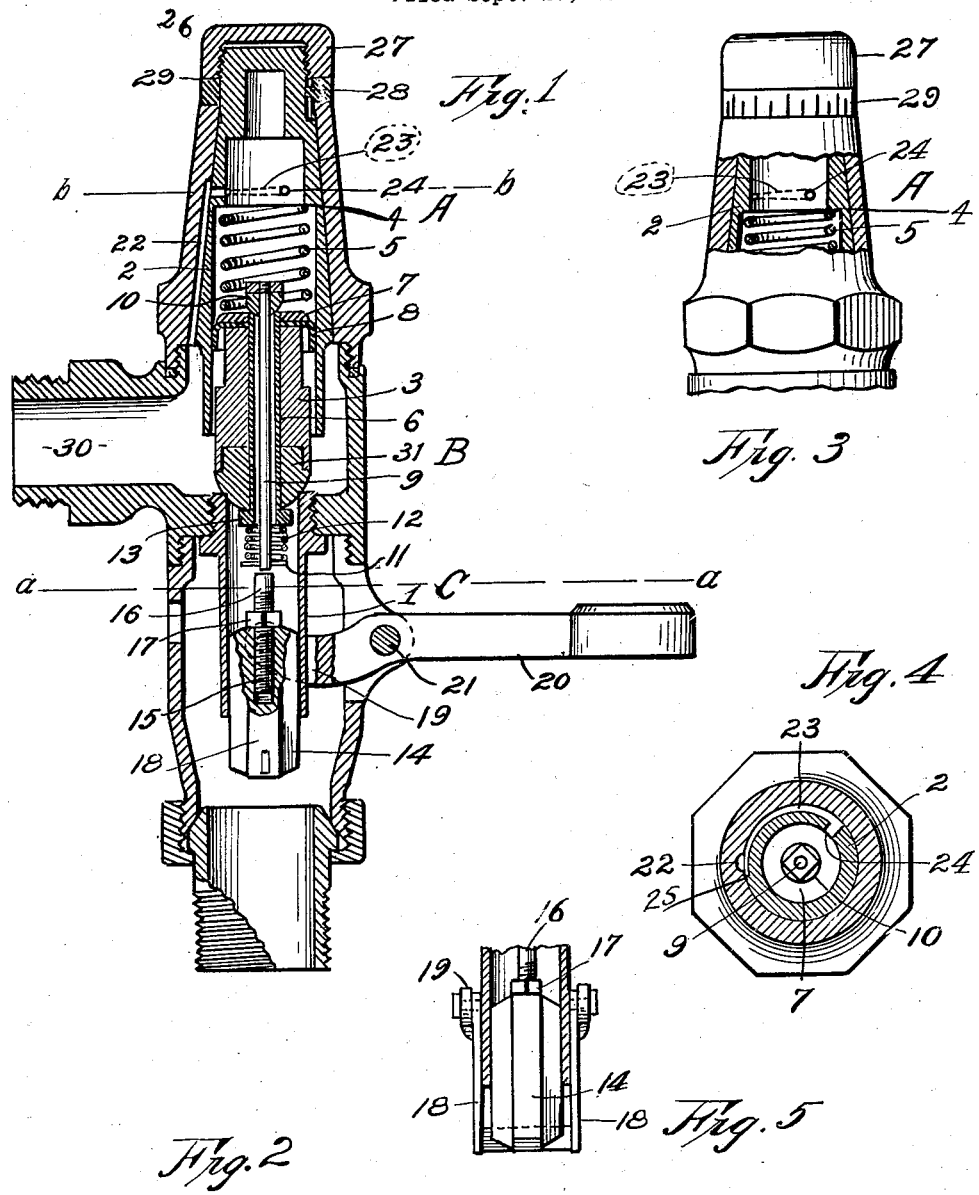
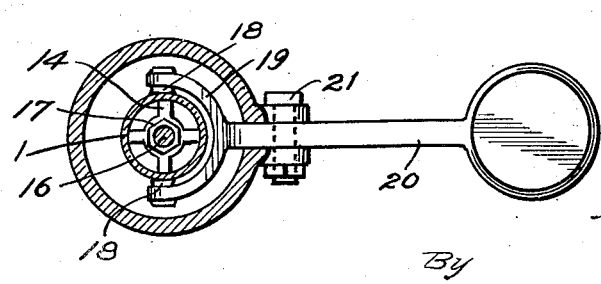
INVENTOR.
Alfred E. Wolff
By
Alfred Oberle
Attorney Patented Apr. 8, 1930

1,753,229

UNITED STATES PATENT OFFICE

ALFRED E. WOLFF, OF KANSAS CITY, MISSOURI

FLUSH VALVE

Application filed September 27, 1927. Serial No. 222,391.

This invention relates to valves and their construction and refers more particularly to flush-valves employed to control the flow of fluids through conduits, such as are used in connection with sanitary devices and appliances.

One of the salient features of this invention is to provide a device with means whereby the valve may be so regulated as to vary the amount of liquid passing therethrough.

Another salient feature of the invention is to produce a valve which is easily adapted to varying liquid pressures.

An additional feature of the invention is to provide a flushing valve which dispenses with a tank or reservoir.

It will also be seen from the description of the invention that there are other advantageous features such as cheapness of construction and installation, economy of liquid consumption, cleanliness and reliability of operation and convenience of installation and operation.

Referring to the drawings:

Figure 1, is a central longitudinal section through a valve embodying the invention, showing the valve in a closed position.

Figure 2, is a sectional view taken along the line $a$—$a$, of Figure 1.

Figure 3, is a fragmental elevational view of the upper portion of the valve, parts thereof being broken away.

Figure 4, is a cross sectional view taken along the line $b$—$b$ of Figure 1.

Figure 5, is a fragmental view through the lower portion of the valve taken at right angles to Figure 1, showing the yoke 18 in position.

Referring to the drawings in detail, the valve body includes an upper section A, a central section B, and a lower section C, the sections being provided with threaded portions so that they may be readily assembled and disassembled, to facilitate installation and repair.

Referring to the drawings, 1 designates a guide tube removably connected with the central section of the valve body.

Above tube 1 is a cone-shaped valve housing 2 in which the main valve—a piston valve—moves, this housing being provided with a shoulder 4, against the upper end of which the coiled spring 5 engages. The lower end of spring 5 rests on the nut 7 which latter holds the washer 8 in position. 10 is a superimposed valve on top of piston valve 3 so arranged that when in normal position it will close the upper end of tube 6 centrally disposed in valve 3 held in position by head 13 and nut 7. Rod 9 is removably attached to valve 10 and extends centrally through tube 6 and held in position by a coiled spring 12 which rests on a pin 11. A movable guide member 14 operates in the guide tube 1. The central part of the movable guide member 14 consists of a threaded core, in which the threaded body 15 of the rod 16, fits. The rod 16 is supplied with a set screw 17. A yoke 18 is attached to the arms 19 of valve operating lever 20, by which the movable guide member 14 is raised. The lever 20 is pivotally connected with the valve body at 21, by means of a pivot pin. A groove or canal 22 is formed in the upper section A communicating with the water inlet pipe 30 and a groove 23 in the convex side of the cone-shaped valve housing 2, terminating in a perforation 24, leading into the interior hollow upper part of the valve housing 2. The groove 23 decreases in width, reaching its minimum size at 25. The upper end of the valve housing 2 is threaded in 26 for the reception of cap 27 which covers the upper extremity of the valve. In the valve housing 2 a groove or notch is formed, into which fits the finger 28 of the graduated ring 29 in such a manner that any movement of the ring 29 will result in a relative movement of the cone-shaped valve housing 2 in a horizontal direction, bringing either the wide or the constricted part of the groove 23 before the canal 22 thereby varying the quantity of liquid passing into the interior of valve housing 2. The graduated ring 29 is equipped with a set screw not shown in this drawing, to insure against any undue movements of the valve housing or the graduated ring.

A washer 31 forms the lower part of the piston valve 3.

The operation of the valve is as follows:

The fluid enters at 30 and assuming that the valve 3 is in its closed position such as shown in Figure 1 of the drawing, rises through canal 22, groove 23 and opening 24 into the interior hollow part of cone-shaped valve housing 2, where it exerts a pressure on piston valve 3 and the superimposed valve or washer 10, no fluid escaping through tube 1 which is closed by washer 31 of piston valve 3. By pressing on the lever 20 the arms 19 will move the guide member 14 upwardly within the guide tube 1 causing the rod 16 to engage the lower end of the rod 9, lifting the valve member or washer 10 from its seat, releasing the liquid in the interior of the valve housing 2, by means of escaping through tube 6, at the same time, elevating the piston valve 3, so as to permit the liquid from pipe 30 to pass thereunder and escape through tube 1. Where valve 3 is in normal closed position the pressure on the system will force the liquid through canal 22, groove 23, opening 24 into the interior of the housing 2, aiding the closing of valve 3 and superimposed valve 10. Thus it will be seen that pressure on the system assists in closing valves 3 and 10 and also insures the maintenance of these valves in a normal closed position.

Should it be desired to vary the fluid pressure in the interior of the valve housing 2 over valves 3 and 10, it is only necessary to loosen cap 27, to permit the turning of the graduated ring 29 in order to bring the wider or the more constricted portion of the groove 23 into contact with canal 22.

It is obvious that by adjusting the rod 16 to a higher or lower level which is accomplished by opening set screw 17 and screwing rod 16 in one or the other direction, in the threaded body 15, the stroke of rod 9 and superimposed valve 10 will be varied by the movement of lever 20.

It is, of course, understood that the construction of this valve may be varied without altering the scope of the invention.

I claim as my invention:

1. A valve of the character described, comprising a sectional body portion, means for removably connecting the sections, a rotatable valve housing within the body portion, said body portion having a groove defining a passage-way, said valve housing having a tapered slot adapted to register with the groove to establish communication between the valve housing and valve body to allow liquid to pass into the valve housing, a valve operating in the valve housing and manually controlled means for moving the valve member to control the amount of liquid passing through the valve body.

2. A flush valve including a body portion, a valve housing mounted within the body portion, said valve body having a groove, adapted to register with a tapered slot in the rotatable valve housing to establish communication between the valve body and valve housing, means for regulating the quantity of liquid passing from the valve housing, a piston valve operating in the valve housing and adapted to move to its closed position under the pressure exerted by the liquid entering the valve housing, manually controlled means for unseating the valve and means for releasing the liquid in the valve housing.

3. A flush valve of the character described comprising a valve body, a main valve seated therein, an auxiliary valve, spring means for maintaining spring tension on the respective valves, a rotatable housing within the valve body above the main valve provided with a duct for supplying fluid to the housing, a tapering groove in the valve housing adapted to connect with the fluid duct and varying the port opening by its rotation.

4. A flush valve of the character described comprising a valve body, a main valve seated within said body, an auxiliary valve seated in the main valve and manually operated means for simultaneously functioning the main and auxiliary valves, a rotatable housing positioned above the main valve having a tapered groove inlet port therein, a duct in the housing registering with the tapered groove inlet port on the rotation of the housing, a cap manually operated from the exterior of the valve body for rotating the valve body and varying the port opening and controlling the introduction of fluid to the valve housing.

ALFRED E. WOLFF.